Aug 5, 1941.  T. L. FAWICK  2,251,445
ASSEMBLY FOR DRIVING CLUTCHES, BRAKES, AND THE
LIKE, AND METHOD OF MAKING THE SAME
Filed Nov. 13, 1940  3 Sheets-Sheet 1
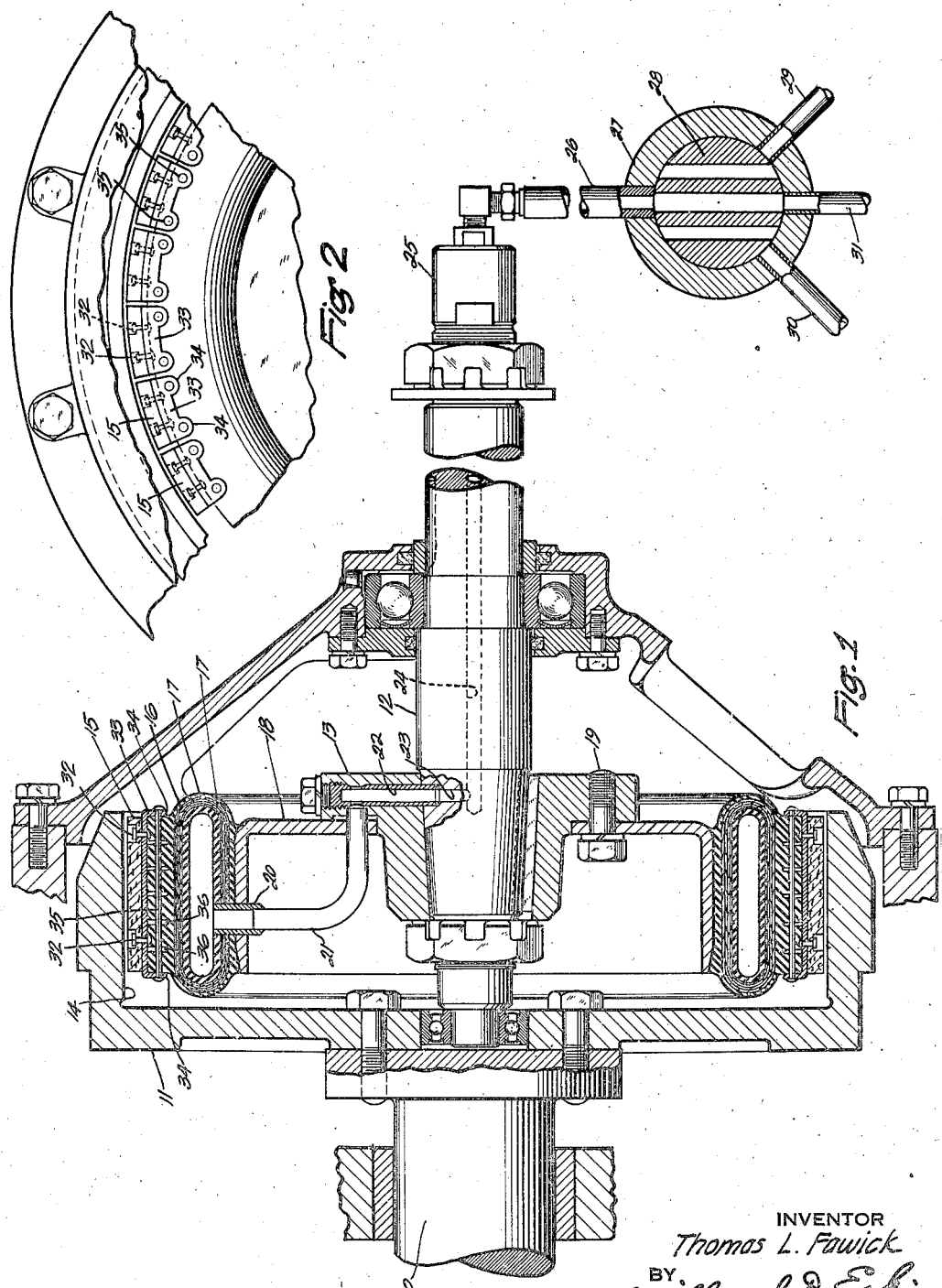
INVENTOR
Thomas L. Fawick
BY
Willard D. Eshin
ATTORNEY Aug 5, 1941.    T. L. FAWICK    2,251,445
ASSEMBLY FOR DRIVING CLUTCHES, BRAKES, AND THE
LIKE, AND METHOD OF MAKING THE SAME
Filed Nov. 13, 1940    3 Sheets-Sheet 3
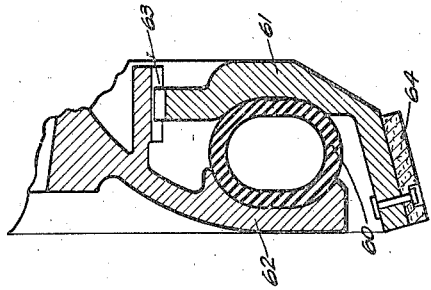
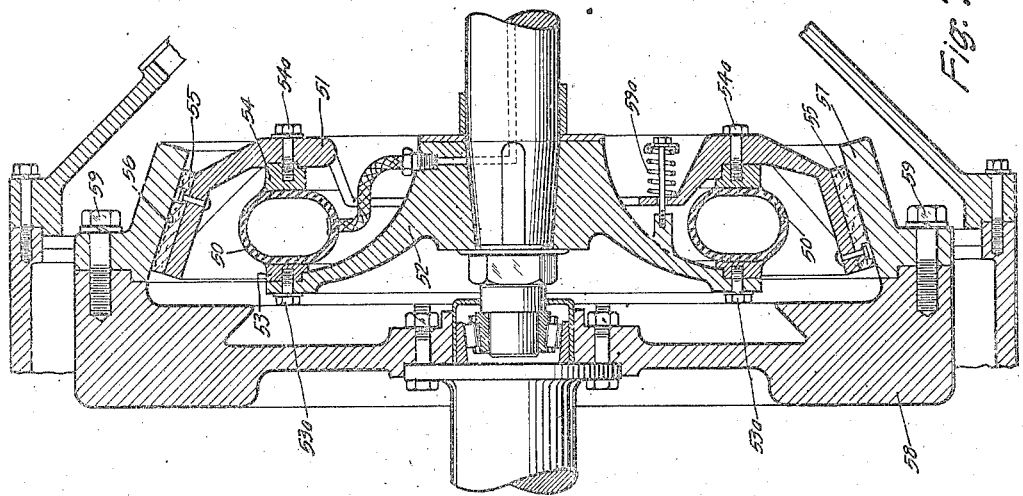
INVENTOR
Thomas L. Fawick
BY
Willard D. Eakin
ATTORNEY Patented Aug. 5, 1941

2,251,445

UNITED STATES PATENT OFFICE 2,251,445

ASSEMBLY FOR DRIVING CLUTCHES, BRAKES, AND THE LIKE, AND METHOD OF MAKING THE SAME

Thomas L. Fawick, Akron, Ohio, assignor to The Fawick General Company, Inc., Akron, Ohio, a corporation of Indiana Application November 13, 1940, Serial No. 365,489

20 Claims. (Cl. 192—88)

This invention relates to assemblies for use as driving clutches and the like and to methods of making such assemblies and parts of the same.

Some of the features disclosed in the present application are subject matter of my copending applications Serial No. 101,638, filed September 19, 1936, and Serial No. 131,656, filed March 18, 1937, and of my United States patents No. 2,111,422, granted March 15, 1938, and No. 2,141,645, granted December 27, 1938.

The chief objects of the present invention are to provide an assembly for use as a clutch, brake or the like in which wear shoes may be conveniently, economically and effectively associated with a fluid-distensible actuating member; to provide desirable cushioning of the torque in such an assembly; to provide flexible shaft-coupling characteristics in such an assembly; and to provide other advantages which will be manifest in the following description.

Of the accompanying drawings:

Fig. 1 is an axial section of a preferred embodiment of my invention as applied to a driving clutch.

Fig. 2 is a fragmentary elevation of portions of the same, as viewed from the right of Fig. 1.

Fig. 7 is a fragmentary axial section of another modification.

Fig. 8 is a fragmentary axial section of still another modification.

Figure 3:
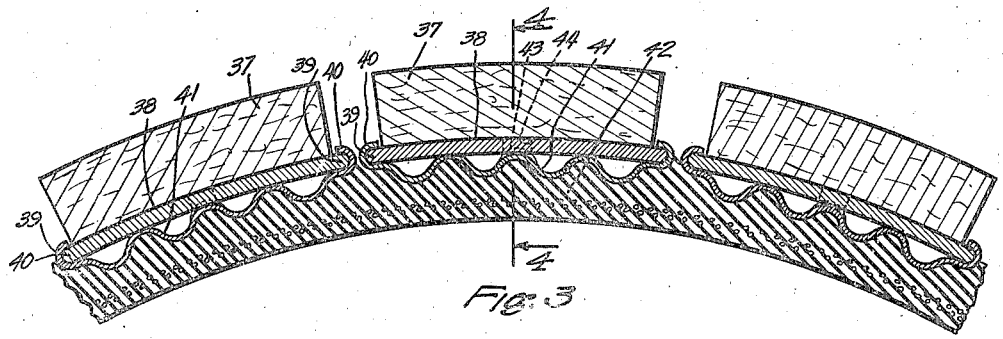
Fig. 3 is a fragmentary section of a modification, taken at right-angles to the axis of rotation.

The embodiment shown in Figs. 1 and 2 comprises a drive shaft 10 having a fly-wheel 11 secured thereon and a driven shaft 12 having secured upon it a clutch hub 13.

The fly-wheel 11 is of bell shape and has a cylindrical inner face 14 adapted to be engaged by a circumferential series of clutch blocks or wear shoes 15, 15 which are mounted upon a torque-transmitting rubber bag 16 which is provided with reinforcing cords 17, 17, preferably, although not necessarily disposed in radial, axial planes only.

The bag 16 is secured by vulcanized adhesion upon an inner clutch member 18 which is secured upon the clutch hub 13, as by a set of bolts such as the bolt 19.

The bag 16 is provided with a fluid-inlet and outlet stem 20 vulcanized in place and connected by a pipe 21, and by a conduit 22 mounted in the hub member 13, with a transverse bore 23 and an axial bore 24 formed in the shaft 12. The axial bore 24 communicates with a rotary air seal 25 mounted on the end of the shaft 12, and through it and a pipe 26 communicates with a valve comprising a casing 27 and a valve-plug 28, the valve being adapted to close off the pipe 26 and, alternatively, to put it in communication with a pressure-fluid pipe 29, a suction pipe 30, and a vent pipe 31, the arrangement thus being such that, alternatively, pressure-fluid and suction can be applied to the interior of the bag 16, and it can be vented to the atmosphere through the pipe 31, and the pipe 26 can be closed off with either pressure-fluid or a partial vacuum in the bag.

An important feature of this embodiment is that the wear shoes 15 are conveniently and economically anchored to the rubber bag 16, by being secured, as by rivets 32, 32, upon the backs of metal saddle members 33, 33, each of which embraces a thick tread portion of the bag 16 and is formed with ears 34, 34 extending toward the axis of rotation and formed with respective holes for pins or long rivets 35, 35 which extend also through holes in the thick tread portion of the bag 16 and thus, by interlocking engagement in the vulcanized soft rubber, securely anchor the saddle members 33 and their respective wear shoes 15 to the rubber bag. I find that even though the rubber has only a hardness approximating that of the usual pneumatic-tire tread, the mating face contact of the wear shoes 15 with the cylindrical inner face 14 of the fly-wheel 11 is of such area as to give the shoes adequate stability against rolling forces, in clutch engagement, that the engagement force is distributed with substantial uniformity throughout the contact areas, and that the anchorage of the pins 35 in the soft rubber is sufficiently strong, with the aid of frictional engagement of the saddles 33 with the rubber, to prevent circumferential slippage of the saddles on the rubber bag, and that, even when the bag transmits the entire torque and has no rigid member for lateral support, the rigid wear shoes, constituting virtually a part of the highly deformable bag itself, function admirably.

Preferably the bag is of greater axial than radial dimension, as shown, for actuation by a comparatively small inflow and outflow of fluid, and for quick overcoming of centrifugal force and for consequently quick and complete clutch disengagement when suction is applied to the interior of the bag. Also, the oblong cross-sectional form of the bag provides a strong clutch-engaging force for a given inflation pressure per square inch.

Preferably the tread portion of the bag is formed with longitudinal grooves 36, 36 for increasing its deformability and improving its frictional grip against the saddles 33.

Figure 4:
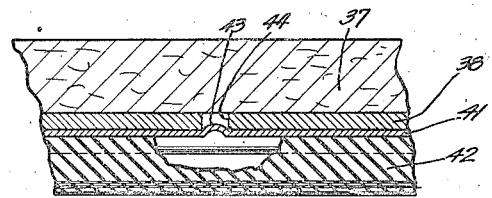
Fig. 4 is a section on line 4—4 of Fig. 3.

An alternative type of bag-and-wear-shoe assembly is illustrated in Figs. 3 and 4, in which wear shoes 37, 37 are secured by adhesion to respective metal base plates 38, 38 having projecting margins 39, 39 adapted to fit in marginal channel flanges 40, 40 of respective spring metal anchorage plates 41, 41 which are secured by vulcanized adhesion upon the tread surface of a fluid-distensible rubber bag 42.

Each of the spring metal anchorage plates 41 is corrugated in a direction parallel with the axis of rotation and is thus adapted to yield slightly and provide a good frictional grip of the margins 39 of the base plates 38, by the marginal channel flanges 40 of the corrugated plates 41, as the base plates 38, with their respective wear shoes 37, are assembled therewith by relative sliding movement parallel with the axis of rotation. Retaining means additional to the frictional fit preferably is provided by forming each of the corrugated plates 41 with a stamped-out detent projection 43 adapted to take into a hole 44 formed in the adjacent base plate 38 as the latter is slid into place, but to be automatically dislodged therefrom when the base plate is forcibly slid out of the corrugated plate for substitution of a new wear shoe.

Preferably, as shown, the corrugations of the plate 41 are of such dimensions that each corrugation contacts the inner face of the base plate 38.

Figure 5:
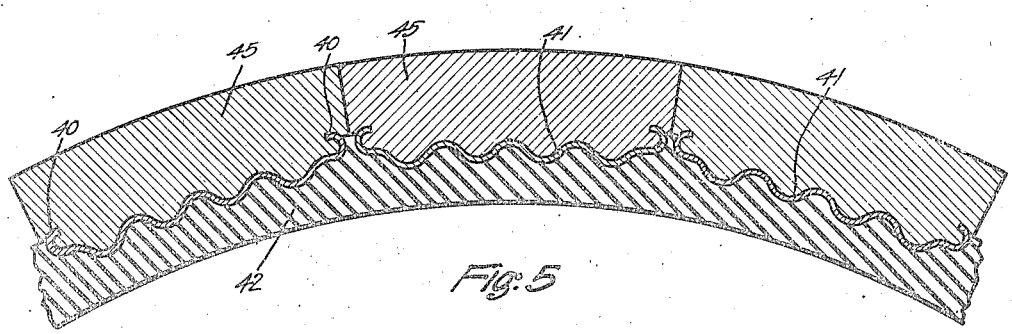
Fig. 5 illustrates a manufacturing method.

For convenience of manufacture, to prevent undesirable extrusion of mold-flash rubber in the vulcanizing of the rubber bag with the corrugated plates upon it, and to hold the corrugated plates to their proper shape during the mold-vulcanizing operation, metal filler blocks 45, 45, Fig. 5, are temporarily mounted in the corrugated plates, and thereafter removed for substitution of the base plates 38 carrying the wear shoes 37.

Figure 6:
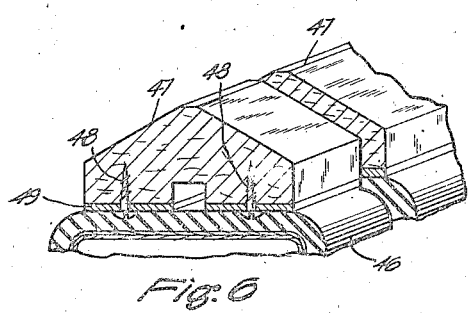
Fig. 6 is a fragmentary perspective view showing an alternative type of wear shoe and an alternative manner of attaching a wear shoe to a distensible actuating member comprising rubber or a rubber-like material.

In Fig. 6 is shown a fluid-distensible bag 46 having mounted upon it a circumferential series of wear shoes 47, 47 having wedge-shaped outer faces for wedging engagement with a complementally formed engagement face of an outer member (not shown), for especially strong frictional engagement for a given bag-distending fluid pressure. In this embodiment each of the wear shoes, preferably formed of the usual asbestos composition, is secured by screws 48, 48 to a metal base-plate 49 which is anchored to the rubber bag 46 by vulcanized adhesion after being assembled with the wear shoe.

In the embodiments thus far described the wear shoes constitute individually rigid force-receiving means and the inner clutch member 18 is a rigid force-delivering member, with the advantages of rigidity in those parts, and yet the assembly has highly desirable flexible-coupling characteristics by reason of the highly deformable, fluid-distensible bag being interposed between the rigid parts.

Somewhat similarly, flexible-coupling characteristics are provided in the assembly shown in Fig. 7, in which a fluid-distensible, and in this instance torque-transmitting, bag 50 is interposed between a rigid force-receiving clutch ring 51 and a rigid force-delivering clutch hub 52, as by having metal rings 53, 54 secured to its axially opposite faces by vulcanized adhesion and secured to the adjacent metal clutch members by cap-screws 53a, 53a and 54a, 54a.

The rigid force-receiving member 51 is of the cone-clutch type and is provided with a conical clutch facing 55 adapted to mate with an inwardly-facing cone-clutch surface 56 formed in a clutch ring 57 which is secured to a fly-wheel 58 by means of cap-screws 59, 59. In this instance the clutch-engaging and disengaging movements resulting from the charging and venting of the rubber bag 50 are of course in an axial direction, but, as above indicated, the invention in its broader aspects is embodied in all of the devices shown in the drawings, and all of them are well adapted to provide some or all of the advantages set out in the above statement of objects. Springs such as the spring 59a are provided for assuring prompt clutch disengagement when the bag is vented.

In the embodiment shown in Fig. 8 the rubber bag, 60, is vulcanized to a clutch ring 61 and a clutch hub 62 and the members 61 and 62 are slip-splined to each other at 63, so that the rubber bag is not required to sustain the torque. The clutch ring 61 is of the cone-clutch type and is provided with a conical clutch facing 64.

An advantage of having a metal base for the wear shoe or clutch facing, such as the plate 33 of Fig. 1, the plate 38 of Fig. 3, the plate 49 of Fig. 6, or the clutch ring 51 of Fig. 7, or 61 of Fig. 8, is that the relatively high heat conductivity of the metal results in the frictional heat of the wear shoe being effectively conducted away from the wearing surface and dissipated to the atmosphere without so raising the temperature of the distensible rubber bag as to cause it to deteriorate rapidly.

The corrugated form of the plates 41 of Fig. 3 provides ventilating channels which further contribute to the protection of the rubber bag from excessive heating.

I claim:

1. The combination of two power-transmitting shafts in series and individually journaled at least approximately in axial alignment, two rotary structures mounted upon and constrained to rotate with the said shafts respectively and adapted for substantially full-circle frictional engagement with each other, one of the same comprising a fluid-containing bag having freely-flexing, torque-transmitting walls and a circumferential series of blocks of frictional material permanently secured to said bag, and means for effecting and discontinuing such engagement during rotation of at least one of said structures.

2. The combination of two power-transmitting shafts in series and individually journaled at least approximately in axial alignment, two rotary structures mounted upon and constrained to rotate with the said shafts respectively and adapted for substantially full-circle frictional engagement with each other, one of the same comprising a fluid-containing bag having freely-flexing, torque-transmitting walls and a circumferential series of blocks of frictional material permanently secured to said bag, the bag comprising rubber-like material and the blocks having permanent adhesion to said material, and means for effecting and discontinuing such engagement during rotation of at least one of said structures.

3. In combination of two power-transmitting shafts in series and individually journaled at least approximately in axial alignment, two rotary structures mounted upon and constrained to rotate with the said shafts respectively and adapted for substantially full-circle frictional engagement with each other, one of the same comprising a fluid-containing bag having freely-flexing, torque-transmitting walls and a circumferential series of blocks of frictional material mounted on said bag and formed with faces angularly disposed with relation to each other for wedging engagement with the other structure, and means for effecting and discontinuing such engagement during rotation of at least one of said structures.

4. The combination of two power-transmitting shafts in series and individually journaled at least approximately in axial alignment, two rotary structures mounted upon and constrained to rotate with the said shafts respectively and adapted for substantially full-circle frictional engagement with each other, one of the same comprising a fluid-containing bag and means for conducting a fluid into the bag during rotation of the bag, the bag being provided with a circumferential series of blocks of frictional material each having a rigid surface of substantially V-form for wedging engagement with another member and each block being anchored to the bag approximately at the ends of the block.

5. The combination of two relatively rotatable structures adapted for frictional engagement with each other, one of the same comprising a distensible member composed at least chiefly of a substance having substantially the resilient deformability of vulcanized soft rubber and a series of wear blocks anchored to the said substance approximately at the ends of the blocks.

6. The combination of two relatively rotatable structures adapted for frictional engagement with each other, one of the same comprising a distensible member composed at least chiefly of a substance having substantially the resilient deformability of vulcanized soft rubber and a series of wear blocks anchored to the said substance, the said blocks being spaced apart and each block being so anchored substantially throughout its length.

7. An assembly comprising a member having an engagement surface, and, mounted for rotation in relation thereto, a fluid-distensible structure adapted to engage said surface upon being distended, and means for conducting pressure fluid to said structure to distend it, the said structure comprising an annular elastic torque-transmitting and cushioning member having an annular tread portion, and a circumferential series of substantially rigid wear members interlocked with said tread portion for cushioned sustension of the torque by said annular elastic member.

8. An assembly comprising a member having an engagement surface, and, mounted for rotation in relation thereto, a fluid-distensible structure adapted to engage said surface upon being distended, and means for conducting pressure fluid to said structure to distend it, the said structure comprising an annular elastic member having an annular tread portion, and a circumferential series of substantially rigid wear members interlocked with said tread portion, a wear member of the series comprising a metal base plate, means extending into the said tread portion of the elastic member to hold the base plate thereon, and a block of frictional material secured upon the base plate.

9. An assembly comprising a member having an engagement surface, and, mounted for rotation in relation thereto, a fluid-distensible structure adapted to engage said surface upon being distended, and means for conducting pressure fluid to said structure to distend it, the said structure comprising an annular elastic member having an annular tread portion, and a circumferential series of substantially rigid wear members interlocked with said tread portion, the tread portion of the elastic member being formed with recesses enhancing its deformability.

10. An assembly comprising a member having an engagement surface, and, mounted for rotation in relation thereto, a fluid-distensible structure adapted to engage said surface upon being distended, and means for conducting pressure fluid to said structure to distend it, the said structure comprising an annular elastic member having an annular tread portion, and a circumferential series of substantially rigid wear members interlocked with said tread portion, the tread portion of the elastic member being formed with grooves in a face thereof that contacts the wear members whereby its frictional grip against the same is enhanced.

11. An assembly comprising a member having an engagement surface and, mounted for rotation in relation thereto, a distensible structure adapted to engage said surface upon being distended, and means for conducting pressure fluid to said structure to distend it, the said structure comprising an annular, elastic member composed at least chiefly of a substance having substantially the resilient deformability of vulcanized soft rubber, and a circumferential series of rigid wear members interlocked with and thereby anchored in the said substance.

12. The combination of two relatively rotatable structures adapted for frictional engagement with each other, one of the same comprising a distensible member composed at least chiefly of a substance having substantially the resilience of vulcanized soft rubber and a series of wear blocks anchored to said substance, each wear block being secured to a metal base plate and the metal base plate having anchorage to the said substance approximately at the ends of the blocks.

13. The combination of two relatively rotatable structures adapted for frictional engagement with each other, one of the same comprising a distensible member composed at least chiefly of a substance having substantially the resilience of vulcanized soft rubber, a series of wear blocks, metal base plates for the wear blocks having portions extending radially inward and straddling a part of the distensible member, and means interlocking said portions and said part.

14. The combination of two relatively rotatable structures adapted for frictional engagement with each other, one of the same comprising a distensible member composed at least chiefly of a substance having substantially the resilience of vulcanized soft rubber, anchorage plates adhered to said substance and formed with guiding channels, and wear blocks mounted with a sliding fit in said guiding channels.

15. The combination of two relatively rotatable structures adapted for frictional engagement with each other, one of the same comprising a distensible member composed at least chiefly of a substance having substantially the resilience of vulcanized soft rubber, corrugated anchorage plates adhered to said substance and formed with guiding channels, and wear blocks mounted with a sliding fit in said guiding channels.

16. The combination of two relatively rotatable structures adapted for frictional engagement with each other, one of the same comprising a distensible member composed at least chiefly of a substance having substantially the resilience of vulcanized soft rubber, anchorage plates adhered to said substance and formed with guiding channels, wear blocks mounted with a sliding fit in said guiding channels, and detent means for holding them therein.

17. The combination of two relatively rotatable structures adapted for frictional engagement with each other, one of the same comprising a distensible member composed at least chiefly of a substance having substantially the resilience of vulcanized soft rubber, a circumferential series of wear blocks mounted thereon, and a metal, heat-dissipating member interposed between each wear block and the said distensible member, the wear member being anchored to the metal member and the metal member being anchored, approximately at its ends, to the distensible member.

18. The method of making an assembly of the character described which comprises molding a fluid-distensible actuating member with interlocking means thereon and thereafter anchoring a wear member thereon by interlocking it with said interlocking means.

19. The method of making an assembly of the character described which comprises molding a fluid-distensible actuating member with a metal anchoring means adhered thereto and thereafter securing a wear member to said anchoring means.

20. The method of making an assembly of the character described which comprises molding, at least chiefly of a substance ultimately having substantially the resilient deformability of vulcanized soft rubber, a distensible actuating member with interlocking means thereon, and thereafter anchoring a wear member thereon by interlocking it with said interlocking means.

THOMAS L. FAWICK.

Disclaimer 2,251,445.—*Thomas L. Fawick*, Akron, Ohio. ASSEMBLY FOR DRIVING CLUTCHES, BRAKES, AND THE LIKE AND METHOD OF MAKING THE SAME. Patent dated Aug. 5, 1941. Disclaimer filed Nov. 18, 1950, by the assignee, *The Fawick Airflex Company, Inc.*

Hereby enters this disclaimer to claims 5, 6, and 8 of said patent.

[*Official Gazette January 23, 1951.*]